United States Patent
Lee et al.

(10) Patent No.: US 9,790,364 B2
(45) Date of Patent: Oct. 17, 2017

(54) THERMOPLASTIC RESIN COMPOSITION AND ARTICLE COMPRISING THE SAME

(71) Applicant: Samsung SDI Co., Ltd., Yongin-si (KR)

(72) Inventors: Woo Jin Lee, Uiwang-si (KR); Jo Won Lee, Uiwang-si (KR); Hyuk Jin Jeong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

(21) Appl. No.: 15/234,086

(22) Filed: Aug. 11, 2016

(65) Prior Publication Data

US 2017/0044364 A1    Feb. 16, 2017

(30) Foreign Application Priority Data

Aug. 13, 2015    (KR) ........................ 10-2015-0114855

(51) Int. Cl.
     *C08L 69/00*      (2006.01)
(52) U.S. Cl.
     CPC .................................. *C08L 69/00* (2013.01)
(58) Field of Classification Search
     None
     See application file for complete search history.

(56) References Cited

U.S. PATENT DOCUMENTS

| | | | |
|---|---|---|---|
| 2014/0187689 A1* | 7/2014 | Kim | ........................ C08K 5/521 524/127 |
| 2015/0065652 A1* | 3/2015 | Kim | ........................ C08L 69/00 525/67 |

FOREIGN PATENT DOCUMENTS

JP      2015-028135 A      2/2015

* cited by examiner

*Primary Examiner* — Vu A Nguyen
(74) *Attorney, Agent, or Firm* — Additon, Higgins & Pendleton, P.A.

(57) ABSTRACT

A thermoplastic resin composition and a molded article manufactured using the same. The thermoplastic resin composition includes: a polycarbonate resin; a rubber-modified aromatic vinyl graft copolymer; an aromatic vinyl copolymer resin; a phosphorus flame retardant; and inorganic fillers, wherein the rubber-modified aromatic vinyl graft copolymer comprises a first rubber-modified aromatic vinyl graft copolymer comprising a rubber polymer having an average particle diameter (D50) of about 100 nm to about 135 nm and a second rubber-modified aromatic vinyl graft copolymer comprising a rubber polymer having an average particle diameter (D50) of about 250 nm to about 400 nm, and a weight ratio of the first rubber-modified aromatic vinyl graft copolymer to the second rubber-modified aromatic vinyl graft copolymer ranges from about 1:0.1 to about 1:about 10. The thermoplastic resin composition can exhibit excellent properties in terms of fatigue resistance, impact resistance, and flame retardancy.

13 Claims, No Drawings

THERMOPLASTIC RESIN COMPOSITION AND ARTICLE COMPRISING THE SAME

CROSS-REFERENCE TO RELATED APPLICATION

This application claims priority under 35 USC Section 119 to and the benefit of Korean Patent Application 10-2015-0114855, filed on Aug. 13, 2015, the entire disclosure of which is incorporated herein by reference.

FIELD OF THE INVENTION

The present invention relates to a thermoplastic resin composition and a molded article including the same.

BACKGROUND

A PC/ABS blend (thermoplastic resin composition) obtained by mixing a polycarbonate (PC) resin with a rubber-modified aromatic vinyl copolymer resin such as acrylonitrile-butadiene-styrene (ABS) can exhibit improved properties in terms of processability and chemical resistance, without deterioration in impact resistance and heat resistance, and can provide cost reduction and is thus used in a variety of applications.

In addition, such a thermoplastic resin composition may include an aromatic vinyl copolymer resin modified with a rubber having an average particle diameter of about 200 nm to about 300 nm or about 1 μm or greater, a flame retardant, and inorganic fillers in order to improve flame retardancy, impact resistance and stiffness.

However, a thermoplastic resin composition prepared using a typical rubber-modified aromatic vinyl copolymer resin and inorganic fillers is likely to suffer deterioration in fatigue resistance and is difficult to use in components requiring mobility, such as a laptop hinge.

Therefore, there is a need for a thermoplastic resin composition which can exhibit improved fatigue resistance with minimal or no deterioration in impact resistance, flame retardancy, and mechanical properties.

SUMMARY OF THE INVENTION

Embodiments of the present invention provide a thermoplastic resin composition that can exhibit excellent properties in terms of fatigue resistance, impact resistance, flame retardancy and balance therebetween, and a molded article including the same.

The thermoplastic resin composition includes: a polycarbonate resin; a rubber-modified aromatic vinyl graft copolymer; an aromatic vinyl copolymer resin; a phosphorus flame retardant; and inorganic fillers, wherein the rubber-modified aromatic vinyl graft copolymer includes a first rubber-modified aromatic vinyl graft copolymer including a rubber polymer having an average particle diameter (D50) of about 100 nm to about 135 nm and a second rubber-modified aromatic vinyl graft copolymer including a rubber polymer having an average particle diameter (D50) of about 250 nm to about 400 nm, and a weight ratio of the first rubber-modified aromatic vinyl graft copolymer to the second rubber-modified aromatic vinyl graft copolymer ranges from about 1:about 0.1 to about 1:about 10.

In exemplary embodiments, the thermoplastic resin composition may include: about 100 parts by weight of the polycarbonate resin; about 1 part by weight to about 40 parts by weight of the rubber-modified aromatic vinyl graft copolymer; about 0.1 parts by weight to about 20 parts by weight of the aromatic vinyl copolymer resin; about 0.1 parts by weight to about 40 parts by weight of the phosphorus flame retardant; and about 0.1 parts by weight to about 40 parts by weight of the inorganic fillers.

In exemplary embodiments, the first rubber-modified aromatic vinyl graft copolymer may be obtained by grafting an aromatic vinyl monomer and a monomer copolymerizable with the aromatic vinyl monomer to a rubber polymer having an average particle diameter (D50) of about 100 nm to about 135 nm, and the second rubber-modified aromatic vinyl graft copolymer may be obtained by grafting an aromatic vinyl monomer and a monomer copolymerizable with the aromatic vinyl monomer to a rubber polymer having an average particle diameter (D50) of about 250 nm to about 400 nm.

In exemplary embodiments, a weight ratio of the first rubber-modified aromatic vinyl graft copolymer to the second rubber-modified aromatic vinyl graft copolymer may range from about 1:about 0.1 to about 1:about 0.8.

In exemplary embodiments, a weight ratio of the rubber-modified aromatic vinyl graft copolymer to the inorganic fillers may range from about 1:about 1.1 to about 1:about 3.

In exemplary embodiments, the aromatic vinyl copolymer resin may be a polymer of a monomer mixture including an aromatic vinyl monomer and a vinyl cyanide monomer.

In exemplary embodiments, the phosphorus flame retardant may include at least one of red phosphorus, phosphate compounds, phosphonate compounds, phosphinate compounds, phosphine oxide compounds, and phosphazene compounds.

In exemplary embodiments, the inorganic fillers may include at least one of talc, glass fibers, wollastonite, whiskers, basalt fibers, mica, and metal flakes.

In exemplary embodiments, the thermoplastic resin composition may have a notched Izod impact strength of about 5 kgf·cm/cm to about 40 kgf·cm/cm, as measured on a ⅛" thick specimen in accordance with ASTM D256, and have a falling dart impact (FDI) strength of about 30 J to about 55 J, as measured on a 1.0 mm thick specimen using a 2 kg dart in accordance with the DuPont drop test method.

In exemplary embodiments, the thermoplastic resin composition may have an index of fatigue resistance of about 5,000 times or more, as measured on a 3.2 mm thick tensile specimen in accordance with ASTM D638 by counting how many times the specimen is compressed and stretched without being broken while repeatedly compressing and stretching the specimen at a load of about 0.8 kN and a frequency of about 10 Hz.

Another embodiment of the present invention relates to a molded article. The molded article is formed of the thermoplastic resin composition as set forth above.

DETAILED DESCRIPTION

The above and other aspects, features, and advantages of the present invention will become apparent from the detailed description of the following embodiments. It should be understood that the present invention is not limited to the following embodiments and may be embodied in different ways, and that the embodiments are provided for complete disclosure and thorough understanding of the present invention by those skilled in the art. The scope of the present invention should be defined only by the appended claims.

A thermoplastic resin composition according to the present invention includes: (A) a polycarbonate resin; (B) a rubber-modified aromatic vinyl graft copolymer; (C) an aromatic vinyl copolymer resin; (D) a phosphorus flame retardant; and (E) inorganic fillers.

(A) Polycarbonate Resin

The polycarbonate resin is a polycarbonate resin used in a typical thermoplastic resin composition. For example, the polycarbonate resin may be an aromatic polycarbonate resin prepared by reacting one or more diphenols (aromatic diol compounds) with a precursor such as phosgene, halogen formate, and carbonate diester.

Examples of the diphenols may include without limitation 4,4'-biphenol, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, and the like, and mixtures thereof. For example, the diphenol may include 2,2-bis-(4-hydroxyphenyl)-propane, 2,2-bis-(3,5-dichloro-4-hydroxyphenyl)-propane, and/or 1,1-bis-(4-hydroxyphenyl)-cyclohexane, for example 2,2-bis-(4-hydroxyphenyl)-propane, which is also referred to as bisphenol A.

In exemplary embodiments, the polycarbonate resin may be a branched polycarbonate resin. For example, the polycarbonate resin may be a branched polycarbonate resin prepared by adding a tri- or higher polyfunctional compound, for example, a tri- or higher valent phenol group-containing compound, in an amount of about 0.05 mol % to about 2 mol % based on the total number of moles of the diphenols used in polymerization.

In exemplary embodiments, the polycarbonate resin may be a homopolycarbonate resin, a copolycarbonate resin, or a blend thereof. In addition, the polycarbonate resin may be partly or completely replaced by an aromatic polyester-carbonate resin obtained through polymerization in the presence of an ester precursor, for example, a bifunctional carboxylic acid.

In exemplary embodiments, the polycarbonate resin may have a weight average molecular weight (Mw) of about 10,000 g/mol to about 200,000 g/mol, for example, about 15,000 g/mol to about 40,000 g/mol, as measured by gel permeation chromatography (GPC). Within this range, the thermoplastic resin composition can have excellent properties in terms of flowability (processability) and the like.

(B) Rubber-Modified Aromatic Vinyl Graft Copolymer

The rubber-modified aromatic vinyl graft copolymer includes (B1) a first rubber-modified aromatic vinyl graft copolymer including a rubber polymer having an average particle diameter (D50) of about 100 nm to about 135 nm and (B2) a second rubber-modified aromatic vinyl graft copolymer including a rubber polymer having an average particle diameter (D50) of about 250 nm to about 400 nm and has a bimodal particle size distribution.

In exemplary embodiments, the first rubber-modified aromatic vinyl graft copolymer (B1) may be obtained by grafting an aromatic vinyl monomer and a monomer copolymerizable with the aromatic vinyl monomer to a rubber polymer having an average particle diameter (D50) of about 100 nm to about 135 nm, for example, about 110 nm to about 130 nm. If the average particle diameter of the rubber polymer is less than about 100 nm, there is a concern of reduction in shock absorption efficiency of the rubber-modified aromatic vinyl graft copolymer, whereas if the average particle diameter of the rubber polymer exceeds about 135 nm, there is a concern that the rubber-modified aromatic vinyl graft copolymer does not have a bimodal particle size distribution and the thermoplastic resin composition including the rubber-modified aromatic vinyl graft copolymer does not exhibit improved fatigue resistance.

In exemplary embodiments, the second rubber-modified aromatic vinyl graft copolymer (B2) may be obtained by grafting an aromatic vinyl monomer and a monomer copolymerizable with the aromatic vinyl monomer to a rubber polymer having an average particle diameter (D50) of about 250 nm to about 400 nm, for example, about 270 nm to about 350 nm. If the average particle diameter of the rubber polymer is less than about 250 nm, there is a concern that the rubber-modified aromatic vinyl graft copolymer does not have a bimodal particle size distribution and is reduced in shock absorption efficiency and the thermoplastic resin composition including the rubber-modified aromatic vinyl graft copolymer does not exhibit improved fatigue resistance, whereas if the average particle diameter of the rubber polymer exceeds about 400 nm, there is a concern of reduction in fatigue resistance and flexural strength of the thermoplastic resin composition including the rubber-modified aromatic vinyl graft copolymer.

In exemplary embodiments, a weight ratio (B1:B2) of the first rubber-modified aromatic vinyl graft copolymer (B1) to the second rubber-modified aromatic vinyl graft copolymer (B2) may range from about 1:about 0.1 to about 1:about 10, for example, about 1:about 0.1 to about 1:about 4. If the weight ratio is less than about 1:about 0.1, the rubber-modified aromatic vinyl graft copolymer can suffer deterioration in shock absorption efficiency, whereas if the weight ratio exceeds about 1:about 10, there is a concern of reduction in fatigue resistance of the thermoplastic resin composition including the rubber-modified aromatic vinyl graft copolymer.

In exemplary embodiments, a weight ratio of the first rubber-modified aromatic vinyl graft copolymer to the second rubber-modified aromatic vinyl graft copolymer may range from about 1:about 0.1 to about 1:about 0.8. Within this range, the thermoplastic resin composition can exhibit further improved fatigue resistance and thus can be useful as a material for a hinge component.

In exemplary embodiments, the rubber-modified aromatic vinyl graft copolymer may be obtained by adding an aromatic vinyl monomer, a monomer copolymerizable with the aromatic vinyl monomer, and, optionally, a monomer for providing processability and heat resistance to rubber polymers each having an average particle diameter (D50) in the above ranges, followed by polymerization (graft copolymerization). Here, polymerization may be performed by any known method such as emulsion polymerization, suspension polymerization, and mass polymerization.

In exemplary embodiments, the rubber-modified aromatic vinyl graft copolymer may be obtained by separately preparing the first rubber-modified aromatic vinyl graft copolymer and the second rubber-modified aromatic vinyl graft copolymer, followed by mixing the first and second copolymers in a weight ratio in the above range, or by mixing the rubber polymers each having an average particle diameter (D50) in the above range with one another in a weight ratio in the above range, followed by grafting an aromatic vinyl monomer and a monomer copolymerizable with the aromatic vinyl monomer to the mixture.

Examples of the rubber polymers may include without limitation: diene rubbers such as polybutadiene, poly(styrene-butadiene), and poly(acrylonitrile-butadiene); saturated rubbers obtained by adding hydrogen to the diene rubbers; isoprene rubbers; acrylic rubbers such as polybutylacrylic acid; and ethylene/propylene/diene terpolymers (EPDM), all of which have an average particle diameter (D50) in the above range. These compounds may be used alone or as a mixture thereof. For example, the rubber polymers may be diene rubbers, for example butadiene rubbers.

The rubber polymers may be present in an amount of about 5 wt % to about 65 wt %, for example, about 10 wt % to about 60 wt %, and as another example about 20 wt % to about 50 wt %, based on the total weight (100 wt %) of the rubber-modified aromatic vinyl graft copolymer. In some embodiments, the rubber-modified aromatic vinyl graft copolymer can include the rubber polymers in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 50, 51, 52, 53, 54, 55, 56, 57, 58, 59, 60, 61, 62, 63, 64, or 65 wt %. Further, according to some embodiments, the amount of the rubber polymers can be in a range from about any of the foregoing amounts to about any other of the foregoing amounts.

Within this range, the thermoplastic resin composition can exhibit excellent fatigue resistance, impact resistance, and mechanical properties.

In exemplary embodiments, the aromatic vinyl monomer is graft-copolymerizable with the rubber polymers. Examples of the aromatic vinyl monomer may include without limitation styrene, α-methyl styrene, β-methyl styrene, p-methyl styrene, p-t-butyl styrene, ethyl styrene, vinyl xylene, monochlorostyrene, dichlorostyrene, dibromostyrene, vinyl naphthalene, and the like. These compounds may be used alone or as a mixture thereof.

The aromatic vinyl monomer may be present in an amount of about 15 wt % to about 94 wt %, for example, about 20 wt % to about 80 wt %, and as another example about 30 wt % to about 60 wt %, based on the total weight (100 wt %) of the rubber-modified aromatic vinyl graft copolymer. In some embodiments, the rubber-modified aromatic vinyl graft copolymer can include the aromatic vinyl monomer in an amount of about 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, or 94 wt %. Further, according to some embodiments, the amount of the aromatic vinyl monomer can be in a range from about any of the foregoing amounts to about any other of the foregoing amounts.

Within this range, the thermoplastic resin composition can exhibit excellent fatigue resistance, impact resistance, and mechanical properties.

Examples of the monomer copolymerizable with the aromatic vinyl monomer may include without limitation vinyl cyanide compounds such as acrylonitrile, methacrylonitrile, ethacrylonitrile, phenyl acrylonitrile, α-chloroacrylonitrile, fumaronitrile, and the like. These compounds may be used alone or as a mixture thereof.

The monomer copolymerizable with the aromatic vinyl monomer may be present in an amount of about 1 wt % to about 50 wt %, for example, about 5 wt % to about 45 wt %, and as another example about 10 wt % to about 30 wt %, based on the total weight (100 wt %) of the rubber-modified aromatic vinyl graft copolymer. In some embodiments, the rubber-modified aromatic vinyl graft copolymer can include the monomer copolymerizable with the aromatic vinyl monomer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50 wt %. Further, according to some embodiments, the amount of the monomer copolymerizable with the aromatic vinyl monomer can be in a range from about any of the foregoing amounts to about any other of the foregoing amounts.

Within this range, the thermoplastic resin composition can exhibit excellent fatigue resistance, impact resistance, and mechanical properties.

Examples of the monomer for providing processability and heat resistance may include without limitation acrylic acid, methacrylic acid, maleic anhydride, N-substituted maleimide, and the like. These compounds may be used alone or as a mixture thereof.

The monomer for providing processability and heat resistance (when present) may be present in an amount of about 15 wt % or less, for example, about 0.1 wt % to about 10 wt %, based on the total weight (100 wt %) of the rubber-modified aromatic vinyl graft copolymer. In some embodiments, the rubber-modified aromatic vinyl graft copolymer can include the monomer for providing processability and heat resistance in an amount of 0 (the monomer is not present), about 0 (the monomer is present), 0.1, 0.2, 0.3, 0.4, 0.5, 0.6, 0.7, 0.8, 0.9, 1, 2, 3, 4, 5, 6, 7, 8, 9, 10, 11, 12, 13, 14, or 15 wt %. Further, according to some embodiments, the amount of the monomer for providing processability and heat resistance can be in a range from about any of the foregoing amounts to about any other of the foregoing amounts.

Within this range, the thermoplastic resin composition can exhibit further improved processability, heat resistance, and mechanical properties without deterioration in other properties.

In exemplary embodiments, the thermoplastic resin composition can include the rubber-modified aromatic vinyl graft copolymer in an amount of about 1 part by weight to about 40 parts by weight, for example, about 5 parts by weight to about 30 parts by weight, based on about 100 parts by weight of the polycarbonate resin. In some embodiments, the thermoplastic resin composition can include the rubber-modified aromatic vinyl graft copolymer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 parts by weight. Further, according to some embodiments, the amount of the rubber-modified aromatic vinyl graft copolymer can be in a range from about any of the foregoing amounts to about any other of the foregoing amounts.

Within this range, the thermoplastic resin composition can exhibit excellent fatigue resistance, impact resistance, and mechanical properties.

(C) Aromatic Vinyl Copolymer Resin

The aromatic vinyl copolymer resin may be an aromatic vinyl copolymer resin used in a typical rubber-modified aromatic vinyl copolymer resin. For example, the aromatic vinyl copolymer resin may be a polymer of a monomer mixture including an aromatic vinyl monomer and a monomer copolymerizable with the aromatic vinyl monomer, such as a vinyl cyanide monomer. The aromatic vinyl copolymer resin does not include a rubber polymer.

In exemplary embodiments, the aromatic vinyl copolymer resin may be obtained by mixing the aromatic vinyl monomer with the monomer copolymerizable with the aromatic vinyl monomer, followed by polymerization of the mixture. Here, polymerization may be performed by any known polymerization method such as emulsion polymerization, suspension polymerization, and mass polymerization.

Examples of the aromatic vinyl monomer may include without limitation styrene, α-methyl styrene, β-methyl styrene, p-methyl styrene, p-t-butyl styrene, ethyl styrene, vinyl xylene, monochlorostyrene, dichlorostyrene, dibromostyrene, vinyl naphthalene, and the like. These compounds may be used alone or as a mixture thereof.

The aromatic vinyl monomer may be present in an amount of about 20 wt % to about 90 wt %, for example, about 30 wt % to about 80 wt %, based on the total weight (100 wt %) of the aromatic vinyl copolymer resin. In some embodiments, the aromatic vinyl copolymer resin can include the aromatic vinyl monomer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments, the amount of the aromatic vinyl monomer can be in a range from about any of the foregoing amounts to about any other of the foregoing amounts.

Within this range, the thermoplastic resin composition can exhibit excellent properties in terms of impact resistance and flowability.

Examples of the monomer copolymerizable with the aromatic vinyl monomer may include without limitation vinyl cyanide monomers such as acrylonitrile, methacrylonitrile, ethacrylonitrile, phenyl acrylonitrile, α-chloroacrylonitrile, fumaronitrile, and the like. These compounds may be used alone or as a mixture thereof.

The monomer copolymerizable with the aromatic vinyl monomer may be present in an amount of about 10 wt % to about 80 wt %, for example, about 20 wt % to about 70 wt %, based on the total weight (100 wt %) of the aromatic vinyl copolymer resin. In some embodiments, the aromatic vinyl copolymer resin can include the monomer copolymerizable with the aromatic vinyl monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments, the amount of the monomer copolymerizable with the aromatic vinyl monomer can be in a range from about any of the foregoing amounts to about any other of the foregoing amounts.

Within this range, the thermoplastic resin composition can exhibit excellent properties in terms of impact resistance and flowability.

In exemplary embodiments, the aromatic vinyl copolymer resin may have a weight average molecular weight (Mw) of about 10,000 g/mol to about 300,000 g/mol, for example, about 15,000 g/mol to about 150,000 g/mol, as measured by gel permeation chromatography (GPC). Within this range, the thermoplastic resin composition can exhibit excellent properties in terms of mechanical strength and moldability.

In exemplary embodiments, the thermoplastic resin composition can include the aromatic vinyl copolymer resin in an amount of about 0.1 parts by weight to about 20 parts by weight, for example, about 1 part by weight to about 15 parts by weight, based on 100 parts by weight of the polycarbonate resin. In some embodiments, the thermoplastic resin composition can include the aromatic vinyl copolymer resin in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, or 20 parts by weight. Further, according to some embodiments, the amount of the aromatic vinyl copolymer resin can be in a range from about any of the foregoing amounts to about any other of the foregoing amounts.

Within this range, the thermoplastic resin composition can exhibit excellent properties in terms of impact resistance, flowability, and appearance.

(D) Phosphorus Flame Retardant

The phosphorus flame retardant may be a phosphorus flame retardant used in a typical flame retardant thermoplastic resin composition. Examples of the phosphorus flame retardant may include without limitation red phosphorus, phosphate compounds, phosphonate compounds, phosphinate compounds, phosphine oxide compounds, phosphazene compounds, and/or metal salts thereof. These compounds may be used alone or as a mixture thereof.

In exemplary embodiments, the phosphorus flame retardant may include an aromatic phosphoric ester compound represented by the following Formula 1:

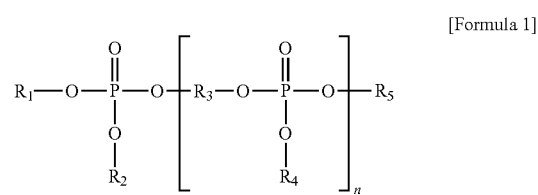

[Formula 1]

wherein $R_1$, $R_2$, $R_4$ and $R_5$ are the same or different and are each independently a hydrogen atom, a $C_6$ to $C_{20}$ aryl group, or a $C_1$-$C_{10}$ alkyl-substituted $C_6$ to $C_{20}$ aryl group; $R_3$ is a $C_6$ to $C_{20}$ arylene group or a $C_1$-$C_{10}$ alkyl-substituted $C_6$ to $C_{20}$ arylene group, for example, derivatives of dialcohols, such as resorcinol, hydroquinone, bisphenol-A, or bisphenol-S; and n is an integer from 0 to 10, for example, from 0 to 4.

When n is 0 in Formula 1, examples of the aromatic phosphoric ester compound represented by Formula 1 may include diaryl phosphates, such as diphenyl phosphate, triphenyl phosphate, tricresyl phosphate, trixylenyl phosphate, tri(2,6-dimethylphenyl) phosphate, tri(2,4,6-trimethylphenyl) phosphate, tri(2,4-di-tert-butylphenyl) phosphate, and tri(2,6-dimethylphenyl) phosphate, without being limited thereto. In addition, when n is 1 in Formula 1, examples of the aromatic phosphoric ester compound may include bisphenol-A bis(diphenyl phosphate), resorcinol bis(diphenyl phosphate), resorcinol bis[bis(2,6-dimethylphenyl) phosphate], resorcinol bis[bis(2,4-di-tert-butylphenyl) phosphate], hydroquinone bis[bis(2,6-dimethylphenyl) phosphate], and hydroquinone bis[bis(2,4-di-tert-butylphenyl) phosphate], without being limited thereto. These compounds may be used alone or as a mixture thereof.

In exemplary embodiments, the thermoplastic resin composition can include the phosphorus flame retardant in an amount of about 0.1 parts by weight to about 40 parts by weight, for example, about 1 part by weight to about 30 parts by weight, based on about 100 parts by weight of the polycarbonate resin. In some embodiments, the thermoplastic resin composition can include the phosphorus flame retardant in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 parts by weight. Further, according to some embodiments, the amount of the phosphorus flame retardant can be in a range from about any of the foregoing amounts to about any other of the foregoing amounts.

Within this range, the thermoplastic resin composition exhibits improved flame retardancy with minimal or no deterioration of other properties.

(E) Inorganic Fillers

The inorganic fillers serve to improve stiffness of the thermoplastic resin composition and may include inorganic fillers used in a typical thermoplastic resin composition. Examples of the inorganic fillers may include without limitation talc, glass fibers, wollastonite, whiskers, basalt fibers, mica, metal flakes, and the like, and mixtures thereof. In exemplary embodiments, the inorganic filler may be talc.

In exemplary embodiments, the inorganic fillers may have various shapes, such as plate, flake, fiber, granule, rod, needle, and/or amorphous shapes, and can have a circular, elliptical, and/or tetragonal (rectangular) shape in section.

In exemplary embodiments, the inorganic fillers may be typical plate-shaped talc. The talc may have an average particle diameter of about 2 μm to about 10 μm, for example, about 3 μm to about 7 μm. Within this range, the thermoplastic resin composition can exhibit excellent properties in terms of stiffness (flexural properties).

In exemplary embodiments, the thermoplastic resin composition can include the inorganic fillers in an amount of about 0.1 parts by weight to about 40 parts by weight, for example about 1 part by weight to about 30 parts by weight, based on about 100 parts by weight of the polycarbonate resin. In some embodiments, the thermoplastic resin composition can include the inorganic fillers in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 parts by weight. Further, according to some embodiments, the amount of the inorganic fillers can be in a range from about any of the foregoing amounts to about any other of the foregoing amounts.

Within this range, the thermoplastic resin composition can exhibit excellent impact resistance, stiffness (flexural properties), and balance therebetween with minimal or no deterioration in other properties.

In exemplary embodiments, a weight ratio of the rubber-modified aromatic vinyl graft copolymer to the inorganic fillers may range from about 1:about 1 to about 1:about 10, for example, about 1:about 1.1 to about 1:about 3. Within this range, the thermoplastic resin can exhibit further improved properties in terms of fatigue resistance, impact resistance, stiffness, and balance therebetween.

The thermoplastic resin composition according to exemplary embodiments may further include release agents, lubricants, plasticizers, heat stabilizers, photostabilizers, flame retardant aids, anti-dripping agents, antioxidants, pigments, dyes, and mixtures thereof.

In exemplary embodiments, the additives may include one or more additives used in a typical thermoplastic resin composition without limitation. Examples of the additives may include without limitation release agents such as polyethylene waxes, fluorine-containing polymers, silicone oils, metal salts of stearic acid, metal salts of montanic acid, and/or montanic acid ester waxes; nucleating agents such as clay; antioxidants such as hindered phenol compounds; and the like, and mixtures thereof. The additives may be present in an amount of about 0.1 parts by weight to about 40 parts by weight based on about 100 parts by weight of the polycarbonate resin, without being limited thereto.

The thermoplastic resin composition according to exemplary embodiments of the present invention may be prepared in pellet form by mixing the aforementioned components, followed by melt extrusion at about 200° C. to about 280° C., for example, about 250° C. to about 260° C. using a typical twin-screw type extruder.

In exemplary embodiments, the thermoplastic resin composition may have a notched Izod impact strength of about 5 kgf·cm/cm to about 40 kgf·cm/cm, for example, about 5 kgf·cm/cm to about 20 kgf·cm/cm, as measured on an about ⅛" thick specimen in accordance with ASTM D256.

In exemplary embodiments, the thermoplastic resin composition may have a falling dart impact (FDI) strength of about 30 J to about 55 J, for example, about 35 J to about 50 J, as measured on an about 1.0 mm thick specimen (about 10 cm×about 10 cm×about 1 mm) using a 2 kg dart in accordance with the DuPont drop test method, in which the impact strength is found by measuring a height of the dart at which the specimen is cracked, followed by converting the height into an energy value.

In exemplary embodiments, the thermoplastic resin composition may have an index of fatigue resistance of about 5,000 times or more, for example, about 5,100 times, and as another example about 6,000 times or more, as measured on a 3.2 mm thick tensile specimen in accordance with ASTM D638 by counting how many times the specimen is compressed and stretched without being broken while repeatedly compressing and stretching the specimen at a load of about 0.8 kN and a frequency of about 10 Hz. A higher index indicates better fatigue resistance of the thermoplastic resin composition (tensile specimen) and thus better applicability of the resin composition to portions requiring mobility, such as a laptop hinge.

Other embodiments of the present invention include a molded article formed of the thermoplastic resin composition as set forth above. For example, the thermoplastic resin composition may be produced into various molded articles by any suitable molding method such as injection molding, extrusion, vacuum molding, and casting. Such a molding method is well known to those skilled in the art. The molded article can have excellent fatigue resistance, flame retardancy, impact resistance, mechanical properties, and balance therebetween and thus can be useful as automotive parts, components of electric/electronic products, and exterior materials. For example, the molded article may be applied to components requiring mobility, such as a laptop hinge.

Next, the present invention will be described in more detail with reference to the following examples. However, it should be noted that these examples are provided for illustration only and should not be construed in any way as limiting the invention.

EXAMPLE

Details of components used in the following Examples and Comparative Examples are as follows:

(A) Polycarbonate Resin

A bisphenol-A polycarbonate resin (weight average molecular weight: 25,000 g/mol) is used.

(B) Rubber-Modified Aromatic Vinyl Graft Copolymer (B1) A g-ABS copolymer obtained by grafting 40 wt % of styrene and acrylonitrile (weight ratio: 71/29) to 60 wt % of butadiene rubber including a rubber polymer having an average particle diameter (D50) of 130 nm is used.

(B2) A g-ABS copolymer obtained by grafting 55 wt % of styrene and acrylonitrile (weight ratio: 71/29) to 45 wt % of butadiene rubber including a rubber polymer having an average particle diameter (D50) of 300 nm is used.

(B3) A g-ABS copolymer obtained by grafting 88 wt % of styrene and acrylonitrile (weight ratio: 83/17) to 12 wt % of butadiene rubber including a rubber polymer having an average particle diameter (D50) of 1 μm is used.

(C) Aromatic Vinyl Copolymer Resin

An=SAN resin (weight average molecular weight: 130,000 g/mol) obtained by polymerizing 68 wt % of styrene with 32 wt % of acrylonitrile is used.

(D) Phosphorus Flame Retardant

Oligomer-type bisphenol-A diphosphate (YOKE BDP, Yoke Chemical) is used.

(E) Inorganic Fillers

Talc (HTP05L, IMIFABI Talc Company) is used.

Examples 1 to 2 and Comparative Examples 1 to 4

The above components are mixed in amounts as listed in Table 1, followed by extrusion at 250° C., thereby preparing pellets. Here, extrusion is performed using a twin-screw extruder having L/D of 36 and a diameter of 45 mm. The prepared pellets are dried at 80° C. to 100° C. for 4 hours or more, followed by injection molding using a 6 oz. injection machine (molding temperature: 250° C., mold temperature: 60° C.), thereby preparing a specimen. The prepared specimen is evaluated as the following properties, and results are shown in Table 1.

Property Evaluation (1) Notched Izod impact strength (unit: kgf·cm/cm): Izod impact strength is measured on a ⅛" thick notched Izod specimen in accordance with ASTM D256.

(2) Flexural strength and flexural modulus (unit: kgf/cm$^2$): Flexural strength (FS) and flexural modulus (FM) are measured on a 3.2 mm thick specimen at 2.8 mm/min in accordance with ASTM D790.

(3) Falling dart impact (FDI) strength (unit: J): FDI strength is measured on a 1.0 mm thick specimen (10 cm×10 cm×1 mm) using a 2 kg dart in accordance with the DuPont drop test method, in which the impact strength is found by measuring a height of the dart at which the specimen is cracked, followed by converting the height into an energy value.

(4) Flame retardancy: Flame retardancy is measured using 5 rods each having a thickness of 1.2 mm in accordance with UL 94 Flammability Testing Standard.

(5) Fatigue resistance: Index of fatigue resistance is measured on a 3.2 mm thick tensile specimen in accordance with ASTM D638 by counting how many times the specimen is compressed and stretched without being broken while repeatedly compressing and stretching the specimen at a load of 0.8 kN and a frequency of 10 Hz. A higher index indicates better fatigue resistance.

TABLE 1

|  |  | Example | | Comparative Example | | | |
| --- | --- | --- | --- | --- | --- | --- | --- |
|  |  | 1 | 2 | 1 | 2 | 3 | 4 |
| (A) (parts by weight) |  | 100 | 100 | 100 | 100 | 100 | 100 |
| (B) (parts by weight) | (B1) | 10 | 5 | 16.7 | — | — | 10 |
|  | (B2) | 6.7 | 11.7 | — | 16.7 | — | — |
|  | (B3) | — | — | — | — | 16.7 | 6.7 |
| (C) (parts by weight) |  | 3.3 | 3.3 | 3.3 | 3.3 | 3.3 | 3.3 |
| (D) (parts by weight) |  | 20 | 20 | 20 | 20 | 20 | 20 |
| (E) (parts by weight) |  | 25 | 25 | 25 | 25 | 25 | 25 |
| Notched Izod impact strength |  | 6.2 | 6.5 | 4 | 5 | 6.8 | 4 |
| Flexural strength |  | 975 | 970 | 990 | 980 | 960 | 990 |
| Flexural modulus |  | 42,000 | 41,500 | 44,000 | 41,500 | 40,000 | 44,000 |
| FDI strength |  | 43 | 44 | 20 | 35 | 44 | 20 |

TABLE 1-continued

|  | Example | | Comparative Example | | | |
| --- | --- | --- | --- | --- | --- | --- |
|  | 1 | 2 | 1 | 2 | 3 | 4 |
| Flame retardancy | V-0 | V-0 | V-0 | V-0 | V-0 | V-0 |
| Index of fatigue resistance | 6,000 | 5,500 | 6,800 | 4,000 | 3,000 | 4,500 |

From the results shown in Table 1, it can be seen that the thermoplastic resin compositions according to the present invention, which include the mixture of the first rubber-modified aromatic vinyl graft copolymer including the rubber polymer having an average particle diameter (D50) of about 100 nm to about 135 nm and the second rubber-modified aromatic vinyl graft copolymer including the rubber polymer having an average particle diameter (D50) of about 250 nm to about 400 nm, exhibit excellent properties in terms of fatigue resistance, impact resistance, stiffness, flame retardancy, and balance therebetween.

Conversely, the thermoplastic resin compositions of Comparative Examples 1 to 4 have a notched Izod impact strength of less than 5 kgf·cm/cm, a FDI strength of less than 30 J, or an index of fatigue resistance of less than 5,000 times and thus exhibit poor properties in terms of impact resistance and/or fatigue resistance.

Although some embodiments have been described above, it should be understood that these embodiments are provided for illustration only and are not to be construed in any way as limiting the present invention, and that various modifications, changes, and alterations can be made by those skilled in the art without departing from the spirit and scope of the invention. Therefore, the scope of the present invention should be defined by the appended claims and equivalents thereof.

What is claimed is:

1. A thermoplastic resin composition comprising:
a polycarbonate resin;
a rubber-modified aromatic vinyl graft copolymer;
an aromatic vinyl copolymer resin;
a phosphorus flame retardant; and
inorganic fillers,
wherein the rubber-modified aromatic vinyl graft copolymer comprises a first rubber-modified aromatic vinyl graft copolymer comprising a diene rubber polymer having an average particle diameter (D50) of 100 nm to 135 nm and a second rubber-modified aromatic vinyl graft copolymer comprising a diene rubber polymer having an average particle diameter (D50) of 250 nm to 400 nm, and
a weight ratio of the first rubber-modified aromatic vinyl graft copolymer to the second rubber-modified aromatic vinyl graft copolymer ranges from 1:0.1 to about 1:10,
wherein the thermoplastic resin composition has an index of fatigue resistance of 5,000 times or more, as measured on a 3.2 mm thick tensile specimen in accordance with ASTM D638 by counting how many times the specimen is compressed and stretched without being broken while repeatedly compressing and stretching the specimen at a load of 0.8 kN and a frequency of 10 Hz.

2. The thermoplastic resin composition according to claim 1, comprising: 100 parts by weight of the polycarbonate resin; 1 part by weight to 40 parts by weight of the rubber-modified aromatic vinyl graft copolymer; 0.1 parts by weight to 20 parts by weight of the aromatic vinyl copolymer resin; 0.1 parts by weight to 40 parts by weight of the phosphorus flame retardant; and 0.1 parts by weight to 40 parts by weight of the inorganic fillers.

3. The thermoplastic resin composition according to claim 1, wherein the first rubber-modified aromatic vinyl graft copolymer is obtained by grafting an aromatic vinyl monomer and a monomer copolymerizable with the aromatic vinyl monomer to a rubber polymer having an average particle diameter (D50) of 100 nm to 135 nm, and the second rubber-modified aromatic vinyl graft copolymer is obtained by grafting an aromatic vinyl monomer and a monomer copolymerizable with the aromatic vinyl monomer to a rubber polymer having an average particle diameter (D50) of 250 nm to 400 nm.

4. The thermoplastic resin composition according to claim 1, wherein a weight ratio of the first rubber-modified aromatic vinyl graft copolymer to the second rubber-modified aromatic vinyl graft copolymer ranges from 1:0.1 to 1:0.8.

5. The thermoplastic resin composition according to claim 1, wherein a weight ratio of the rubber-modified aromatic vinyl graft copolymer to the inorganic fillers ranges from 1:1.1 to 1:3.

6. The thermoplastic resin composition according to claim 1, wherein the aromatic vinyl copolymer resin is a polymer of a monomer mixture comprising an aromatic vinyl monomer and a vinyl cyanide monomer.

7. The thermoplastic resin composition according to claim 1, wherein the phosphorus flame retardant comprises at least one of red phosphorus, phosphate compounds, phosphonate compounds, phosphinate compounds, phosphine oxide compounds, and phosphazene compounds.

8. The thermoplastic resin composition according to claim 1, wherein the inorganic fillers comprise at least one of talc, glass fibers, wollastonite, whiskers, basalt fibers, mica, and metal flakes.

9. The thermoplastic resin composition according to claim 1, wherein the thermoplastic resin composition has a notched Izod impact strength of 5 kgf·cm/cm to 40 kgf cm/cm, as measured on a ⅛" thick specimen in accordance with ASTM D256, and has a falling dart impact (FDI) strength of 30 J to 55 J, as measured on a 1.0 mm thick specimen using a 2 kg dart in accordance with the DuPont drop test method.

10. A molded article formed of the thermoplastic resin composition according to claim 1.

11. A hinge component formed of the thermoplastic resin composition according to claim 1.

12. The thermoplastic resin composition according to claim 1, wherein the filler is talc with an average particle size of 3 to 7 microns.

13. The thermoplastic resin composition according to claim 1, wherein the first and second rubber-modified aromatic vinyl graft copolymers are acrylonitrile-butadiene-styrene (ABS) graft copolymers.

* * * * *

UNITED STATES PATENT AND TRADEMARK OFFICE
CERTIFICATE OF CORRECTION

PATENT NO. : 9,790,364 B2
APPLICATION NO. : 15/234086
DATED : October 17, 2017
INVENTOR(S) : Woo Jin Lee et al.

It is certified that error appears in the above-identified patent and that said Letters Patent is hereby corrected as shown below:

In the Claims

Claim 1, Column 12, delete Line 53 and insert:
--matic vinyl graft copolymer ranges from 1:0.1 to--

Signed and Sealed this
Twenty-fourth Day of April, 2018

Andrei Iancu
*Director of the United States Patent and Trademark Office*